United States Patent [19]

Vongeheur

[11] Patent Number: 4,526,299

[45] Date of Patent: Jul. 2, 1985

[54] APPARATUS FOR POURING CONFECTIONARY SOLUTION

[75] Inventor: Hermann-Otto Vongeheur, Neuwied, Fed. Rep. of Germany

[73] Assignee: Winkler & Dunnebier Maschinenfabrik und Eisengiesserei GmbH & Co. KG, Neuwied, Fed. Rep. of Germany

[21] Appl. No.: 421,453

[22] Filed: Sep. 22, 1982

[30] Foreign Application Priority Data

Sep. 25, 1981 [DE] Fed. Rep. of Germany ....... 3138148

[51] Int. Cl.³ .............................................. A23G 3/12
[52] U.S. Cl. .................. 222/146.4; 222/137; 222/255
[58] Field of Search .......... 222/255, 137, 309, 146 HS, 222/146 HE, 146 H; 99/483; 426/520; 239/139, 390–391, 596; 425/6, 378 R, 146.2, 146.4, 146.5

[56] References Cited

U.S. PATENT DOCUMENTS

| 978,131 | 12/1910 | Boyd | 426/520 |
| 2,274,432 | 2/1942 | Repsher et al. | 222/146 HS |
| 2,597,175 | 5/1952 | Perkins | 222/137 |
| 2,831,214 | 4/1958 | Etles et al. | 222/146 HE |
| 3,239,379 | 3/1966 | von Drachenfels | 426/520 X |
| 3,895,740 | 7/1975 | van der Buylton-Domgraff | 222/309 X |

FOREIGN PATENT DOCUMENTS

| 2937921 | 4/1981 | Fed. Rep. of Germany . | |
| 45-35934 | 11/1970 | Japan | 425/378 R |
| 325389 | 2/1930 | United Kingdom . | |
| 956333 | 4/1964 | United Kingdom . | |
| 1481177 | 7/1977 | United Kingdom . | |

Primary Examiner—Charles A. Marmor

[57] ABSTRACT

A process and apparatus for pouring confectionery solution is provided. The apparatus basically comprises a supply tank heated to approximately 80° C., a dosing system, a nozzle plate and heating means. The proportion of the confectionery solution which is branched off from the supply tank for a pouring operation receives heat as it passes through the dosing system and/or the nozzle plate.

4 Claims, 3 Drawing Figures

APPARATUS FOR POURING CONFECTIONARY SOLUTION

The invention relates to a process for pouring confectionery solution and to an apparatus for the practice of the process. The invention relates more particularly to a process for pouring confectionery solution by means of a device as used as part of a mogul apparatus.

Mogul apparatuses having pouring facilities have been used for many years past in the confectionery industry. The pouring facility has, during this period, developed into a fairly standardized item, comprising basically a heatable supply boiler, a dosing or dispensing system, a nozzle plate having a number of exit nozzles, and a control valve. The function of the valve is to connect the dosing system alternately to the supply tank and to the nozzle plate.

A disadvantage of the standard facility as just outlined is that it is unsuitable for processing confectionery containing gelling agents. Confectionery of this kind, whose main ingredient consists, for instance, of gum arabic, gelatin, agar or other gelling agents, tends upon completion of pouring to form at the exit end of the pouring nozzles a filament which not only results in a highly unwanted change in the shape of the end product but also leads to soiling of the pouring molds and, consequently, to breakdowns in operation in extreme cases.

The tendency to form filaments depends, of course, *inter alia* upon the viscosity of the confectionery solution it is required to pour, such tendency decreasing as viscosity decreases. There are two ways of adjusting the viscosity of the solution—by action on its water content or dry substance content and by action on its temperature. Viscosity decreases with rising temperature and with rising water content. The experts in the art have previously considered that a temperature of approximately 80° C. is the maximum permissible temperature and that there is an inevitable impairment of the quality of the solution at higher temperatures. Unfortunately, a temperature of approximately 80° C. is nowhere near high enough to obviate the risk of filamentation. It has therefore been considered necessary for the proportion of dry substance in the solution to be much lower than commercially desirable for the end product; the required proportion of dry substance in the end product varies with different gelling agents but is around 90%, whereas the proportion of dry substance in the solution, again with variations for different gelling agents, is around 75%—i.e., the end product is required to have an approximately 10% water content, whereas the water content of the pouring solution must be around 25%, if filamentation is to remain at an acceptably low level. Consequently, something like 15%—and considerably more in many recipes—of the poured weight is surplus water which must be removed after the solution has been poured. Powderless mogul plants are unable to do this. Consequently, the use of these conventional pouring facilities, as far as processing of the confectionery solutions outlined is concerned, is restricted to ordinary mogul practices—i.e., mogul apparatuses using mold recesses formed in powder. In this case, of course, the powder present in the mold boxes can absorb the surplus water content, but at the cost of substantial disadvantages. For instance, the approximately 30 minutes gelling time of confectionery poured without excess of water compares with the several days' drying time of confectionery poured with an excess of water.

Moreover, the mold powder boxes with their contents must be kept, for longer than several days, in conditioned rooms at a temperature of the order of magnitude of 60° C.

A confectioner wishing to use conventional pouring facilities to process confectionery containing gelling agents must therefore make sure he has sufficient mold powder and mold powder boxes available for several days' production, besides having conditioned premises large enough to hold several days' production; last, but not least, the power costs for his conditioned premises are substantial.

It is therefore the object of the invention to provide a process for pouring a confectionery solution of end-product composition and to provide an apparatus for the practice of the process.

In accordance with the invention, that proportion of the confectionery solution which is branched off from the supply tank for a pouring operation receives heat as it passes through the dosing system and/or nozzle plate.

Tests have shown that there is no quality impairment of the confectionery solution if the time for which the solution is subjected to elevated temperatures is fairly short.

The process according to the invention makes sure of this in a simple way, since the confectionery solution is present in the dosing system or nozzle plate only for the period of time between two consecutive pourings.

Consequently, the process in accordance with the invention makes it possible for the first time to process confectionery solution containing gelling agents in the end-product composition.

The disadvantages which have been mentioned and which are associated with removal of surplus water in the conventional process, are therefore obviated. More particularly, the invention makes it possible to produce confectionery containing gelling agents in powderless mogul plants.

Several embodiments of the process according to the invention will be described in greater detail hereinafter.

Figure 1:
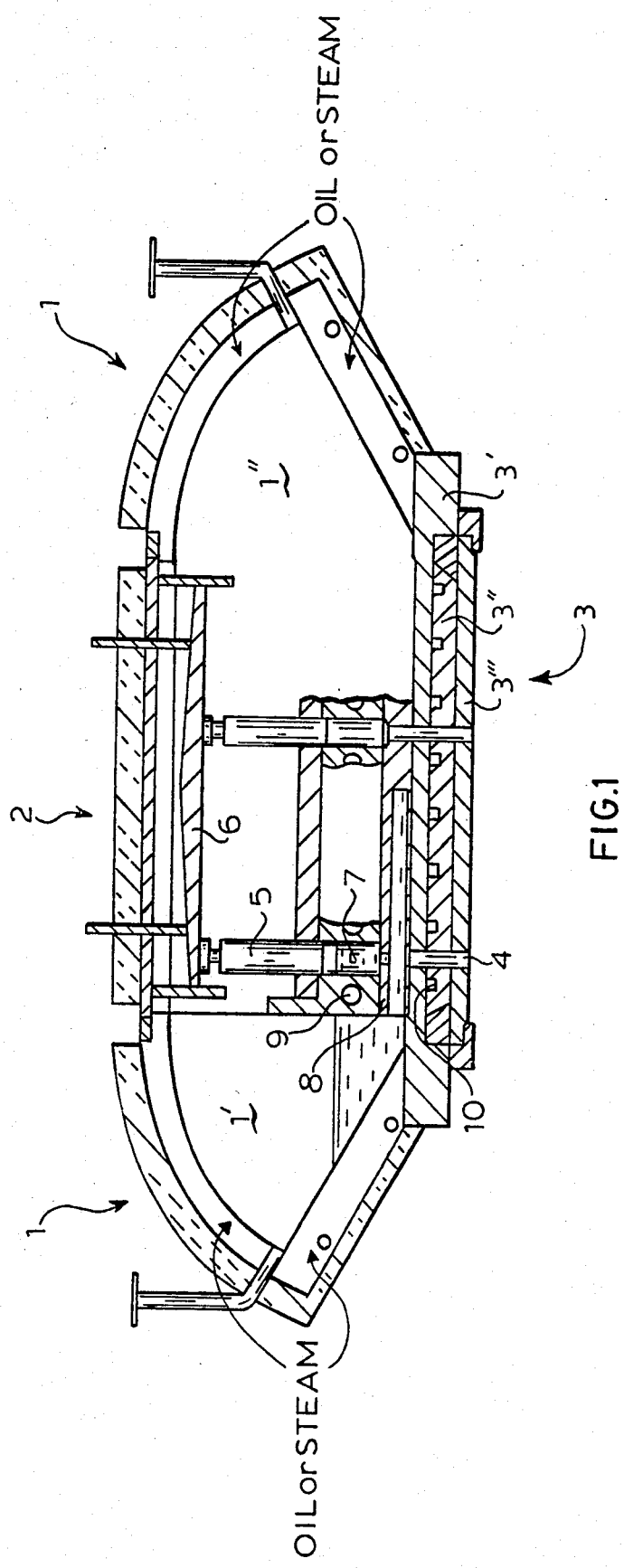
FIG. 1 is a section through a pouring device having a heatable dispensing system and a heatable nozzle plate.

The process according to the invention, the underlying idea of which is, as previously stated, to briefly heat the confectionery solution for pouring to above 80° C., can best be described with reference to an apparatus for the practice of the process. As can be seen in FIG. 1, such an apparatus mainly comprises a supply tank 1 and a dispensing or dosing system 2 having at the bottom a nozzle plate 3 receiving discharge or exit nozzles 4. Tank 1 is divided into two component tanks 1', 1" disposed along the long sides of the dosing system to reduce heat losses. The dosing system 2 itself comprises a number of pistons or plungers 5 which are reciprocated vertically and together in cylinder bores 7 by means of a beam 6, and a control valve 8 which is disposed below the bores 7 and which is adapted to move forwards and backwards in the plane of FIG. 1. The function of the valve 8 is to connect bores 7 to tank 1 when the pistons 5 rise and to connect the bores 7 to the nozzles 4 when the pistons 5 descend. Consequently, the bores 7 fill up with confectionery solution during the rising movements of the pistons 5, and during their descent the solution in the bores 7 is displaced into mold boxes (not shown) which move through below the nozzle plate and which are formed with mold recesses.

As so far described, this pouring device does not differ, apart from the supply tank, from conventional pouring devices. The difference from the latter resides in the fact that the dosing or dispensing system and the nozzle plate are heatable. The dosing system and the nozzle plate are formed with ducts 9, 10, respectively, for the passage of a heat vehicle. In the embodiment shown, the heat vehicle is steam, which is necessary anyway in the production of confectionery for the boilers. By way of mixing valves (not shown), the steam temperature is adjustable within limits; experience has shown that optimum results are achieved with a steam temperature of approximately 110° C. at the entry of the dosing system and of approximately 120° C. at the nozzle plate entry. At these temperatures, the confectionery solution is heated from approximately 80° C. at the entry of the dispensing system 2 to just about 100° C. at the exit from the nozzle plate 3. However, the latter temperature is reached completely, only near the end of a pouring operation. At the beginning of pouring, the temperature on the exit side of the nozzle plate 3 is lower than 100° C. This completely advantageous phenomenon is due to the "railway terminus effect" of the dosing system—the first drop of every confectionery solution batch derived from the tank 1 and supplied to any of the bores 7 of the system 2 is also the drop which is the last to leave its bore. Therefore, it has the longest possible dwell time in the dosing system and, therefore, is at the highest temperature.

Figure 2:
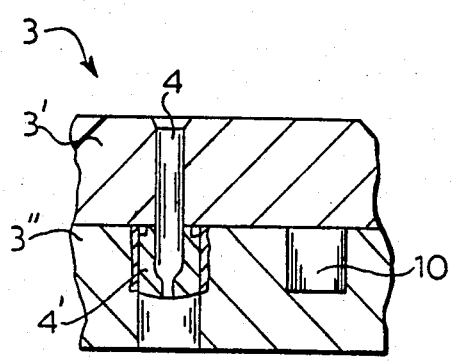
FIG. 2 is a partial section through a heatable nozzle plate.
Figure 3:
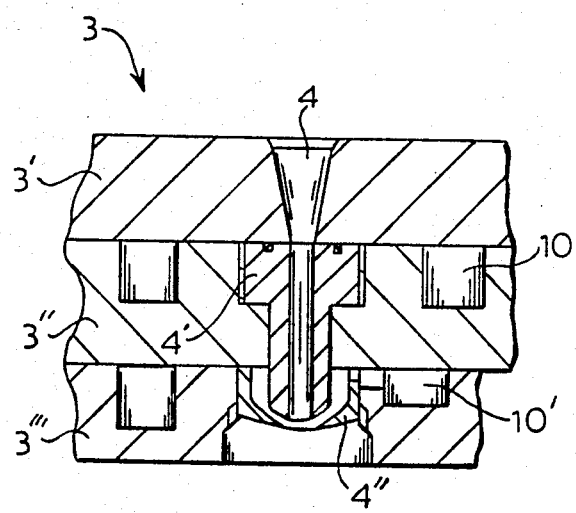
FIG. 3 is a partial section through a variant of a nozzle plate as shown in FIG. 2.

The nozzle plate 3 and, more particularly, the discharge nozzles 4 therein also provide a substantial contribution, because of the higher steam temperature in this region, to the heat exchange between the steam heat vehicle and the confectionery solution flowing through the nozzle plate. Their construction is therefore very important. FIG. 1 shows the nozzles 4 in the form of ordinary cylindrical bores. Basically, bores of this kind operate satisfactorily but more advantageous constructions are shown in FIGS. 2 and 3. Nozzle plate 3 of FIG. 2 comprises a main plate 3' adjacent to the control valve 8 (not shown in FIG. 2) and, below the main plate 3', an insert holder plate 3" which has the ducts 10 for the steam heat vehicle, the actual nozzles, in the form of nozzle inserts 4', being disposed in the plate 3". The main feature of this construction is that the nozzle inserts 4' are set back inside the plate 3". Consequently, an air temperature close to the temperature of the plate 3" arises inside the bores receiving the nozzle inserts 4', with the result of a further reduction of any remaining tendency to filamentation despite the increase in the temperature of the dosing system and nozzle plate.

A variant of the nozzle plate of FIG. 2 is shown in FIG. 3. As in FIG. 2, the nozzle plate comprises a main plate 3', an insert holder plate 3" with the nozzle inserts 4' and a baseplate 3''' having inserts 4". In contrast to the embodiment of FIG. 2, in FIG. 3, the nozzle insert 4' projects beyond the bottom edge of the insert holder plate 3" and into the inserts 4" of the baseplate 3'''. The projecting part of the nozzle insert 4' cooperates with the insert 4" to form an annular nozzle into whose annular gap steam or hot air is introduced by way of a duct 10'. Due to the substantially frustum-like shape of the insert, this flow hot air or steam narrows shortly before the exit orifice the nozzle insert 4' and thus concentrates its effect in the zone where it is necessary to melt away any incipient breakaway filaments.

While only several embodiments of the present invention have been shown and described, it is obvious that many changes and modifications may be made thereunto, without departing from the spirit and scope of the invention.

What is claimed is:

1. An apparatus for pouring a confectionery solution comprising:
 (a) a confectionery solution supply tank;
 (b) dosing means coupled to said supply tank;
 (c) a nozzle plate coupled to said dosing means, said nozzle plate comprising, disposed one below another, a main plate, an insert holder plate and a base plate having frustrum-shaped inserts, said insert holder plate having nozzle inserts which project beyond the bottom edge of said insert holder plate and so extend into said frustrum-shaped inserts disposed in said base plate so that part of the nozzle inserts which project beyond the bottom edge of the insert holder plate cooperate with said frustrum-shaped inserts to form annular nozzles having an annular gap which narrow toward the exit end and wherein said nozzle plate also includes ducts for establishing communication between said annular gap and a heat medium supply; and
 (d) heating means for heating said dosing means and said nozzle plate.

2. The apparatus of claim 1, wherein said dosing means and said nozzle plate are formed with bores and ducts, respectivly, for the passage of a heat medium.

3. The apparatus of claim 2, wherein said bores and ducts communicate with a steam supply.

4. The apparatus of claim 1, wherein said supply tank is divided into two component tanks which extend along the long sides of said dosing means.

* * * * *